United States Patent [19]

Minowa

[11] 4,044,262

[45] Aug. 23, 1977

[54] IONIZATION SMOKE SENSOR

[75] Inventor: Osami Minowa, Tokyo, Japan

[73] Assignee: Hochiki Corporation, Tokyo, Japan

[21] Appl. No.: 655,615

[22] Filed: Feb. 5, 1976

[30] Foreign Application Priority Data

Feb. 10, 1975 Japan .................................. 50-17773

[51] Int. Cl.$^2$ .............................................. G01N 23/12

[52] U.S. Cl. ...................................... 250/381; 250/385

[58] Field of Search ............... 250/381, 382, 384, 385, 250/389; 340/237 S

[56] References Cited

U.S. PATENT DOCUMENTS 3,710,110 1/1973 Lampart et al. ..................... 250/381

3,725,011 4/1973 Purt et al. ........................ 250/381 X

*Primary Examiner*—Davis L. Willis

*Attorney, Agent, or Firm*—Wenderoth, Lind & Ponack

[57] ABSTRACT

An ionization smoke sensor wherein the electric circuit of the sensor is surrounded by a first metallic case; an ionization chamber into which smoke from the exterior enters is constructed of a radiation source, an intermediate electrode and an outer electrode; the outer electrode is formed of a second metallic case; and the first and second metallic cases are electrically connected through a member of conductive elastomer, so that electric elements of the electric circuit are protected from external electrostatic charges.

3 Claims, 4 Drawing Figures

IONIZATION SMOKE SENSOR

DETAILED DESCRIPTION OF THE INVENTION

This invention relates to an ionization smoke sensor for detecting the occurrence of a fire. More particularly, it relates to an ionization smoke sensor in which an FET (field effect transistor) etc. employed as a circuit element of the sensor can be protected from external electrostatic charges.

As an ionization smoke sensor, there has generally been known one which, as shown in FIG. 1, comprises an inner electrode 1, an intermediate electrode 2, an outer electrode 3 having apertures through which smoke from the exterior can enter, an outer ionization chamber 4 enclosed within the outer electrode 3, an inner ionization chamber 5 enclosed by the intermediate electrode 2, a radiation source 6, etc. In such a sensor, a voltage is applied between the inner electrode 1 and the outer electrode 3 via terminals 7 and 8. Air in the inner ionization chamber 5 and the outer ionization chamber 4 is ionized by radioactive rays from the radiation source 6, so that ionic currents flow owing to the applied voltage. When smoke attributed to, for example, the outbreak of a fire enters into the outer ionization chamber 4, the voltage between the outer electrode 3 and the intermediate electrode 2 increases. An FET is accordingly turned "on " to generate a voltage across a resistance R, so that an alarm signal is issued by the voltage from an output terminal 9.

The FET in such a smoke sensor is often destroyed due to static electricity. More specifically, since the FET has the function of a detector, one of about 100 pF capable of detecting a small current is used. Accordingly, the FET is hardly immune to external electrostatic charges. In this case, a circuit in which a diode is additionally incorporated in order to protect the FET might be considered. Since, however, the detection current of the sensor flows in a branched state, the FET must be operated by itself.

The conventional ionization smoke sensor is encased in a socket made of a synthetic resin. Therefore, electrostatic charges are prone to develop and the sensor is prone to be charged.

Accordingly, when an object which bears electrostatic charges comes close to the ionization smoke sensor or into contact therewith or when fingers touch the sensor during inspection, a large current often flows through the FET causing it to break down. Even though the FET is not broken down, the sensor issues an erroneous alarm in some cases.

To protect against such undesirable electrical effects on the electric elements in the ionization smoke sensor, U.S. Pat. No. 3,710,110 has proposed a protective measure. In that invention, an electric circuit including electric elements is provided between two ionization chambers, and plate-like electrodes are provided between the electric circuit and the respective ionization chambers. The plate-like electrodes are intended to prevent bad influences from the ionization chambers, and are not intended to prevent the breakdown of the FET etc. against the external electrostatic charges as in the ionization smoke sensor of this invention.

Apart from the foregoing, the ionization smoke sensor of this type employs a high impedance circuit in order to connect a large number of sensing portions. When the external air enters into the circuit portion, the insulation thereof is degraded by moisture in the air. This leads to the disadvantage that a false alarm is issued.

Further, when external air containing gaseous sulfurous acid flows into the chamber accommodating the electric circuit, it corrodes the electric circuit and causes trouble.

It is therefore the first object of this invention to provide an ionization smoke sensor wherein even when the sensor is affected by external electrostatic charges, the FET etc. in the electric circuit neither produces an erroneous output signal nor is damaged.

The second object is to provide an ionization smoke sensor wherein a first metallic case surrounding an electric circuit and a second metallic case forming an outer electrode are electrically connected through a conductive elastomer, so that the electric circuit is effectively protected from external electrostatic charges.

The third object is to provide an ionization smoke sensor wherein an electric circuit is enclosed by a first metallic case, an insulating plate and an elastomer member and wherein an outer ionization chamber etc. into which the external air such as smoke flows and a chamber in which the electric circuit is accommodated are isolated from each other by a socket, the elastomer member and the insulating plate, so that the electric circuit is prevented from being corroded by the external air etc.

Figure 1:
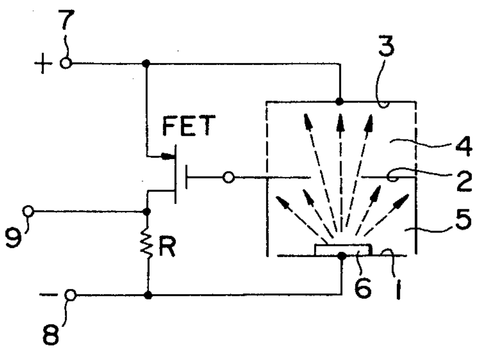
FIG. 1 is an electric circuit diagram of a conventional ionization smoke sensor.
Figure 2:
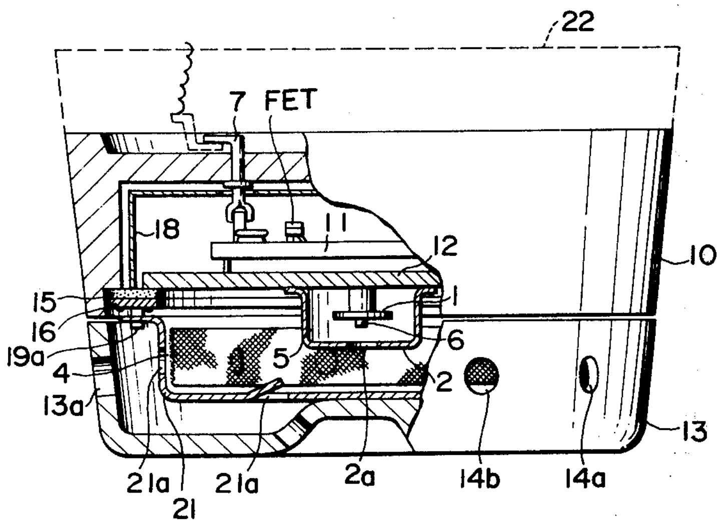
FIG. 2 is an elevation view, partly in section, of an ionization smoke sensor according to this invention.
Figure 3:
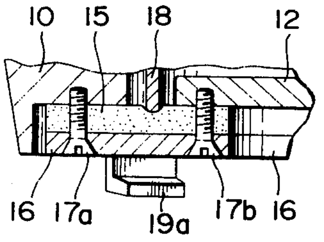
FIG. 3 is an enlarged sectional view of essential portions of the sensor of FIG. 2.
Figure 4:
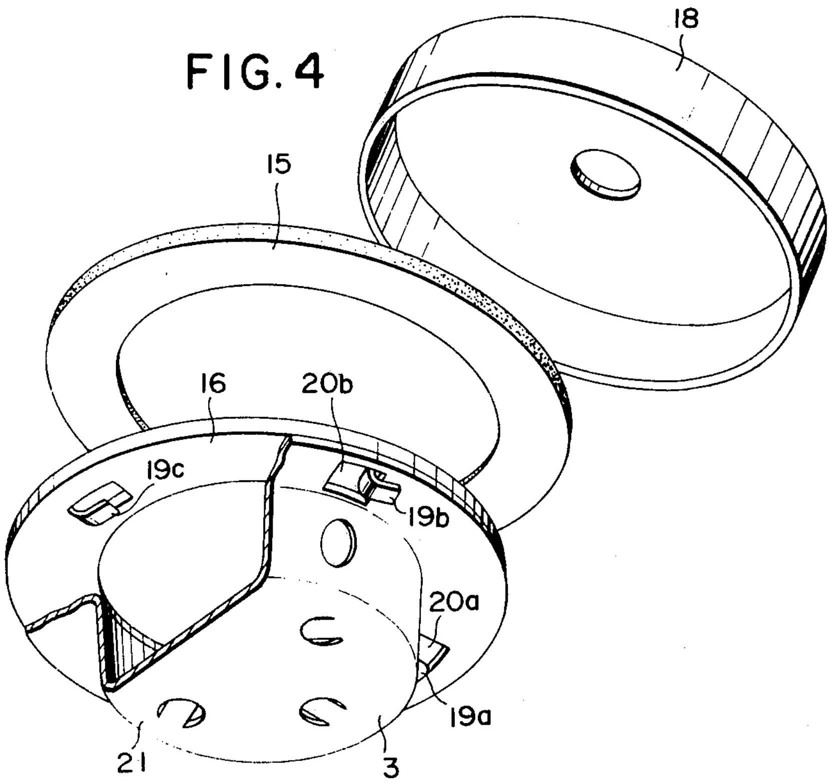
FIG. 4 is an exploded perspective view of the essential portions of the sensor of FIG. 2.

The ionization smoke sensor of this invention will now be described with reference to FIGS. 2 to 4. A printed circuit board 11 is disposed over a disc-shaped insulating plate 12 and has the electric circuit of the sensor assembled thereon. An FET (field effect transistor) etc. which is in electric element of the electric circuit is mounted on the upper surface of the printed circuit board 11. The printed circuit board 11 is surrounded by a cylindrical metallic case (first metallic case) 18 which is closed at one end. As will be described later, the edge of the open end of the metallic case 18 is fixed to the insulating plate 12 by mean of a member 15 of conductive elastomer and a mounting frame 16. The material of the metallic case 18 is, for example, aluminum. Disposed at the center of the lower surface of the insulating plate 12 is an inner electrode 1, to which a radiation source 6 is fixed in electrical connection therewith. An intermediate electrode 2 which surrounds the radiation source 6 and which defines an inner ionization chamber 5 therein is attached to the insulating plate 12. The intermediate electrode 2 is tubular, and an opening 2*a* through which radioactive rays pass is provided in a shield plate of the intermediate electrode at a position opposite to the radiation source 6. A second metallic case 21 is provided which surrounds the outer periphery of the intermediate electrode 2 and in which an outer ionization chamber 4 is defined. The second metallic case 21 serves also as an outer electrode 3, and apertures 21*a* through which smoke from the exterior enters are provided in the tubular wall and shield plate of the outer electrode. A wire gauze is provided in contact with the inner wall of the second metallic case 21 and provides electrostatic shielding for the apertures 21*a*. Mounting holes 20*a*, 20*b* and 20*c* are provided in a flange of the metallic case 21 which faces the outer peripheral edge of the insulating plate 12. By turning the metallic case 21, the mounting holes 20*a*, 20*b* and 20*c* are brought into engagement with mounting pieces 19*a*, 19*b* and 19*c* which protrude beyond the lower surface of the annular mounting frame 16. The member of conductive elastomer 15 having the same annular shape as that of the mounting frame 16 is interposed between the mounting frame 16 and the insulating plate 12. The mounting frame 16 and the elastomer 15 lie one over the other, and their inner peripheral part is attached to the insulating plate 12 by screws 17*b*. The outer peripheral part of the mounting frame 16 and the elastomer 15 is fixed by screws 17*a* to a socket 10 which surrounds the first metallic case 18. The elastomer 15 thus secured supports the outer peripheral edge portion of the first metallic case 18, so that the first metallic case 18 is electrically connected with the second metallic case 21 through the conductive elastomer 15, screws 17*a* and 17*b*, and the mounting pieces 19*a* to 19*c* of the mounting frame 16. For the member of conductive elastomer 15, there can be generally used members which are obtained by molding an elastic and rubber-like high polymer material with carbon, metal particles etc. mixed therein. In particular, an elastomer having silicone rubber as the elastic material thereof has properties which are desirable in view of the special requirements of a disaster preventing appliance, namely that the resistances to external air, ultraviolet rays, water etc. are high, that the allowable temperature range is wide, that the molding thereof is easy and that the rate of secular deformation is small. By using carbon granules, metal particles, glass beads covered with silver, or the like, as the conductive material the elastomer can be given a desired conductivity. The peripheral edge of the first metallic case 18 and the elastomer 15 exhibiting elasticity are in contact over the whole periphery of the case 18, so that the electrical connection between the two members is good. Further, since the engagement between the socket 10 and the elastomer 15 is substantially air tight, the smoke etc. which has entered into the outer ionization chamber 4 does not flow into the chamber including the electric circuit. The outer periphery of the second metallic case 21 is surrounded by a cover 13, which is fixed to the bottom part of the second metallic case 21 by screws. The side wall of the cover 13 has openings 13*a* so that the smoke from the exterior can enter into the outer ionization chamber 4. The upper part of the socket 10 is held by a supporter 22 which is attached to a ceiling portion of a building. Input and output terminals of the electric circuit are connected with terminals outside the socket by means of a detachable terminal component which extends through the socket 10 as well as the first metallic case 18.

When, in the sensor constructed as described above, the smoke flows into the outer ionization chamber 4 at the outbreak of a fire, the voltage across the intermediate electrode 2 and the outer electrode 3 becomes high and makes the FET conductive, so that the sensor produces an alarm signal as an output.

The electric circuit is surrounded by the first metallic case electrically connected with the outer electrode. Therefore, where the outside surface of the ionization smoke sensor according to this invention has received external electrostatic charges, the electric circuit is shielded from the static electricity by the first metallic case, and the FET etc. are not affected by the static electricity. The electrical connection between the first metallic case and the outer electrode (the second metallic case) is made through the contact over the entire periphery thereof owing to the presence of the annular member of conductive elastomer, and the coupling between the first metallic case and the elastomer member is reliably made owing to the elastic force of the conductive elastomer.

Furthermore, owing to the use of the conductive elastomer, the chamber which accommodates the electric circuit is perfectly airtightly isolated from the ionization chambers into which the smoke enters, so that the electric circuit is not corroded by the smoke or external air containing sulfurous acid gas.

I claim:

1. An ionization smoke sensor comprising an insulating plate, an electric sensor circuit including a field effect transistor disposed on one side of said insulating plate, a first metallic case surrounding said electric circuit and spaced therefrom, an inner electrode disposed on the opposite side of said insulating plate from said electric sensor circuit, a radiation source connected to said inner electrode, the intermediate electrode surrounding said inner electrode, a second metallic case surrounding said intermediate electrode and defining an ionization chamber therewith, said second metallic case serving as the outer electrode, means electrically connecting said first metallic case and said second metallic case, and said electrodes being coupled to said sensor circuit for supplying to the field effect transistor a voltage generated across the intermediate electrode and the outer electrode when smoke enters the ionization chamber and causing the field effect transistor to produce an output signal in response to the voltage.

2. An ionization smoke sensor as claimed in claim 1 wherein said first metallic case and said second metallic case have the outer edges thereof opposed, and said means electrically connecting said first and second metallic cases is a member of conductive elastomer interposed between the opposed outer peripheral edges.

3. An ionization smoke sensor as claimed in claim 2 wherein said insulating plate and said member of conductive elastomer close the first metallic case for isolating the interior of said first metallic case from the ionization chamber.

* * * * *